US011811905B1

(12) United States Patent
Logelin (10) Patent No.: US 11,811,905 B1
(45) Date of Patent: Nov. 7, 2023

(54) SYSTEM AND METHOD OF COMPENSATING FOR ACTUAL DATA PATH LATENCY

(71) Applicant: Keysight Technologies, Inc., Santa Rosa, CA (US)

(72) Inventor: Donald M. Logelin, Divide, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/828,698

(22) Filed: May 31, 2022

(51) Int. Cl.
*H03D 3/24* (2006.01)
*H04L 7/00* (2006.01)

(52) U.S. Cl.
CPC .................................. *H04L 7/0037* (2013.01)

(58) Field of Classification Search
CPC ....... H04L 7/0037; G11C 7/22; G11C 7/1072; G06F 11/1679; H04J 3/0685
USPC .......................... 375/373, 375, 376, 371, 355
See application file for complete search history.

(56) References Cited

U.S. PATENT DOCUMENTS

| 5,475,690 | A | 12/1995 | Burns et al. | |
|---|---|---|---|---|
| 8,582,391 | B2 * | 11/2013 | Chiu | G11C 7/1072 365/194 |
| 10,033,523 | B1 * | 7/2018 | Remla | H04J 3/0685 |
| 11,178,055 | B2 | 11/2021 | Foo et al. | |
| 2003/0231537 | A1 * | 12/2003 | Stark | G11C 7/22 365/201 |
| 2013/0034134 | A1 * | 2/2013 | Chiu | G11C 7/1072 375/299 |
| 2014/0195728 | A1 * | 7/2014 | Hsu | G06F 11/1679 711/105 |

OTHER PUBLICATIONS

Alberto Aloisio et al., "High-Speed, Fixed-Latency Serial Links With FPGAs for Synchronous Transfers", IEEE Transactions on Nuclear Science, vol. 56, No. 5, Oct. 2009, pp. 2864-2873.
"Native High-Speed I/O Interfaces", Xilinx, XAPP1274 (v1.2) Sep. 6, 2019, pp. 1-71.
Jim Tatsukawa, "Asynchronous Data Capture Using the High Speed SelectIO Wizard", Xilinx, XAPP1330 (v1.1) Aug. 3, 2018, pp. 1-21.

\* cited by examiner

Primary Examiner — Phuong Phu (57) ABSTRACT

A system and method compensate for latency, where the system includes a transmit module and a receive module that implements a DLL in a pseudo synchronous communications link. The method includes determining maximum data latency based on synchronous latencies and analog delays; measuring an actual data path latency by determining a delay in receiving a test pattern transmitted from the transmit module at the receive module using a common synchronization pulse provided the transmit and receive modules simultaneously or with a known fixed latency separation during calibration; determining a latency difference between the determined maximum data latency and the measured data path latency; and compensating for the latency difference for a subsequent data signal transmitted from the transmit module in the pseudo synchronous communications link, such that a total latency of the system with regard to the subsequent data signal is equal to the maximum data latency for the system.

20 Claims, 3 Drawing Sheets

SYSTEM AND METHOD OF COMPENSATING FOR ACTUAL DATA PATH LATENCY

BACKGROUND

As communication speeds increase, time variations between clock domains and data paths in transmitters and receivers become significant enough that simple source synchronous time interfaces are not practical. One solution is to add a phase compensation first-in first-out (FIFO) circuit in the receive path of the receiver to account for timing variations. However, the FIFO circuit in the receive path introduces latency uncertainty. There are also analog delays that may have delay variation greater than one bit time, thereby introducing additional latency variation.

Running communication systems at higher clock rates, such as Peripheral Component Interconnect (PCI), PCI eXtensions for Instrumentation (PXI), and PXI Express (PXIe) high speed data networks, allow for fewer communication signals to achieve a given data rate at a lower cost. Such communication systems include high speed data links Also, a pseudo synchronous communication link does not require a clock to be forwarded with the data, but only requires that the transmitter and receiver share a common reference clock, which also reduces cost. Latency variations are not acceptable for many communication systems that require communication links to run at high clock speeds, especially when latency variations are in order of the unit interval (UI) of the data being transferred. Many communication systems even have known fixed latency requirements from data transmitted to data received. Most communication systems that require higher clock speeds for the higher data rates but also has requirement of fixed link latency have had to reduce clock rates to a point that synchronous communications techniques may be used.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements" relationships to one another, as illustrated in the accompanying drawings. These relative terms are intended to encompass different orientations of the elements thereof in addition to the orientation depicted in the drawings. For example, if a sensor device (e.g., a probe) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Generally, according to various embodiments, a communication system and method of operating the communication system are provided that allow for adjustments of high clock rate, pseudo synchronous data communications to have fixed latency. More particularly, the method includes determining a maximum data latency for the communication system, measuring actual data path latency for the communication system, and determining the difference between the maximum data latency and measured data latency during a calibration stage, and then compensating for the difference between the maximum data latency and measured data latency for data signals during a subsequent operational stage, such that the total latency is always equal to the maximum data latency (providing the fixed latency). This enables use of fewer communications lines through the pseudo synchronous communications link, and therefore lowers system costs. That is, for the pseudo synchronous communication link where latency variations become in order of the data rate (1 UI) and these latency variations are not acceptable, then a designer may need to reduce the data rate and establish multiple communication links in parallel to get the same required throughput. If latency variations can be avoided, then a single communication link can operate at higher data rate delivering the same desired throughput.

According to a representative embodiment, a system is provided for performing eye tracking on signals, where the system has a maximum data latency. The system includes a transmit module configured to transmit signals in a pseudo synchronous communications link; a receive module configured to receive the signals from the transmit module in the pseudo synchronous communications link, and to provide the eye tracking; a synchronization pulse generator configured to generate a common synchronization pulse that arrives at the transmit module and the receive module simultaneously or with a known fixed delay separation during calibration of the system; and a reference clock generator configured to provide a common clock signal to the transmit module and the receive module. The transmit module includes a pattern generator configured to output a unique alignment test pattern upon reception of the synchronization pulse during the calibration. The receive module includes a delay locked loop (DLL) configured to perform eye tracking on the test pattern, keeping a sample point of the test pattern in a center of a data eye to provide data and clock recovery of the test pattern in response to the common clock signal; a symbol aligner module configured to align the test pattern from the DLL to a symbol boundary corresponding to the common clock signal, to provide one full symbol per clock cycle, in response to the synchronous pulse received from the synchronization pulse generator to provide aligned data; a pattern detector module configured to detect the test pattern in the aligned data, and to output a stop signal in response to the detected test pattern and the synchronous pulse received from the synchronization pulse generator; a latency measurement module configured to begin a latency measurement in response to the synchronous pulse received from synchronization pulse generator, and to stop the latency measurement in response to the stop signal output from the pattern detector; and a latency compensation module configured to determine a latency difference between the latency measurement provided by the latency measurement module during the calibration and the maximum data latency of the system, and to add the latency difference to a subsequent data signal, transmitted from the transmit module to the receive module in the pseudo synchronous communications link after the calibration, to compensate for the latency difference, such that a total latency of the system with regard to the subsequent data signal is equal to the maximum data latency for the system.

According to another representative embodiment, a method is provided for compensating for latency in a system that includes a transmit module and a receive module in a pseudo synchronous communications link, the receive module implementing a DLL for the signals received from the transmit module. The method includes determining a maximum data latency for the system based on synchronous latencies and analog delays; and measuring an actual data path latency by determining a delay in receiving at the receive module a test pattern transmitted from the transmit module using a common synchronization pulse provided to the transmit module and the receive module simultaneously or with a known fixed latency separation during calibration of the system. Measuring the actual data path latency includes transmitting the test pattern from the transmit module to the receive module in response to receiving the common synchronization pulse at the transmit module; starting a latency count at the receive module in response to receiving the common synchronization pulse at the receive module; ending the latency count at the receive module in response to receiving the test pattern at the receive module, the latency count indicating the actual data path latency; determining a latency difference between the determined maximum data latency and the measured data path latency based on the latency count; and compensating for the latency difference for a subsequent data signal transmitted from the transmit module to the receive module in the pseudo synchronous communications link, such that a total latency of the system with regard to the subsequent data signal is equal to the maximum data latency for the system.

According to another representative embodiment, a system is provided for performing eye tracking on signals in a pseudo synchronous communications link, where the system has a maximum data latency. The system includes a pattern generator configured to output a unique alignment test pattern upon reception of a synchronization pulse during calibration of the system; a serializer configured to serialize the test pattern output by the pattern generator; a synchronization pulse generator configured to generate the synchronization pulse during the calibration; a reference clock generator configured to provide a common clock signal; a DLL configured to perform eye tracking on the test pattern; a deserializer configured to deserialize the test pattern output by the DLL; a symbol aligner module configured to align the test pattern from the DLL to a symbol boundary (one full symbol per clock cycle) corresponding to the common clock signal to provide aligned data; a pattern detector module configured to detect the test pattern in the aligned data, and to output a stop signal in response to the detected test pattern and the synchronous pulse received from the synchronization pulse generator; a latency measurement module configured to begin a latency measurement in response to the synchronous pulse received from synchronization pulse generator, and to stop the latency measurement in response to the stop signal output from the pattern detector; and a latency compensation module configured to determine a latency difference between the latency measurement provided by the latency measurement module during the calibration and the maximum data latency of the system, and to compensate for the latency difference to a subsequent data signal communicated through the pseudo synchronous communications link after the calibration, such that a total latency of the system with regard to the subsequent data signal is equal to the maximum data latency for the system. The synchronization pulse arrives at the pattern generator, the symbol aligner, the pattern detector module, and the latency measurement module simultaneously or with a known fixed delay separation.

Figure 1:
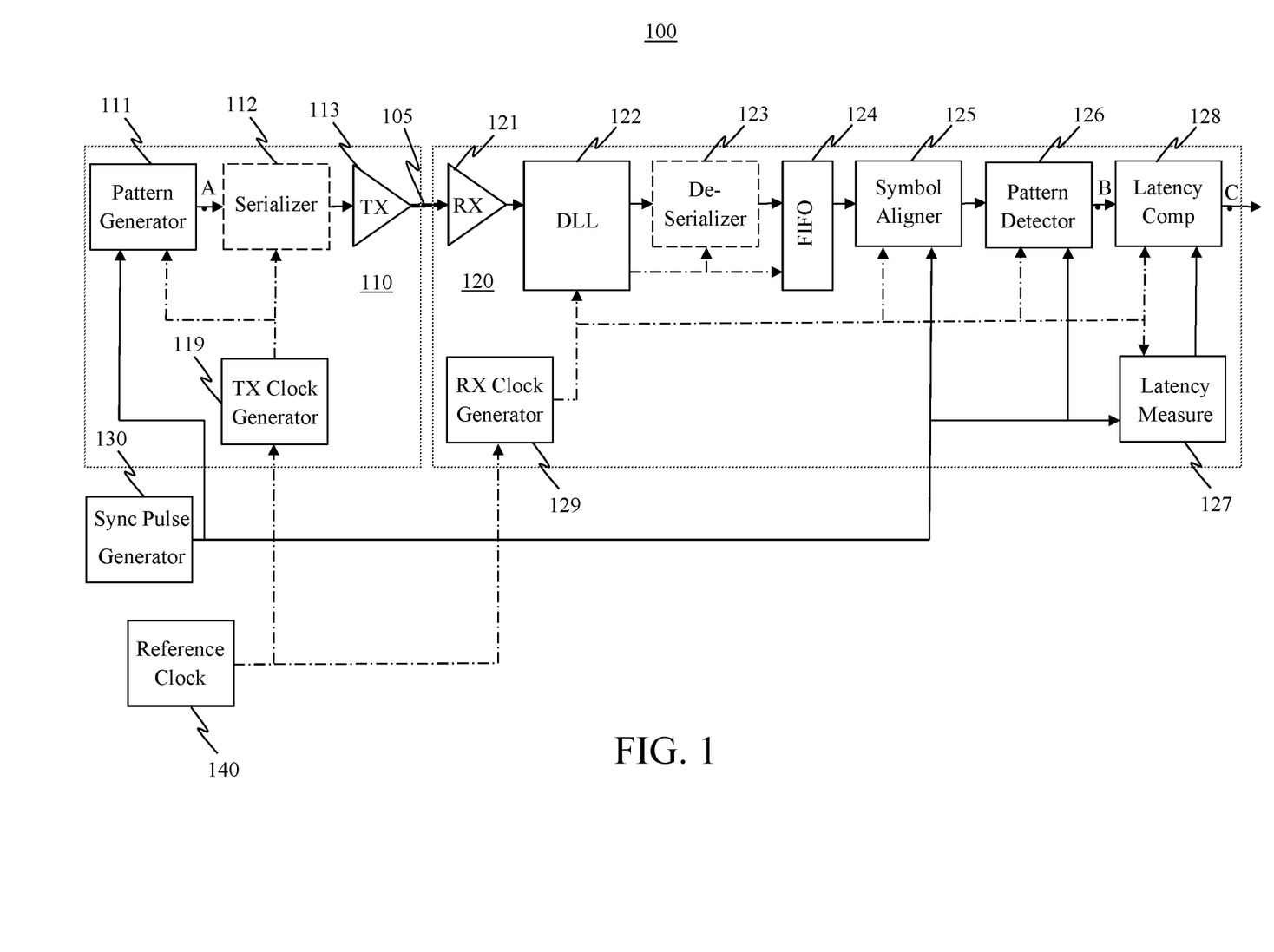
FIG. 1 is a simplified block diagram of a communication system for performing eye tracking of signals while compensating for latency, according to a representative embodiment.

FIG. 1 is a simplified block diagram of a communication system for performing eye tracking of signals while compensating for latency, according to a representative embodiment.

Referring to FIG. 1, communication system 100 is a pseudo synchronous communications link, and includes a transmit (TX) module 110 configured to transmit signals and a receive (RX) module 120 configured to receive the signals from the transmit module 110. The receive module 120 performs eye tracking on the received signal using a delay lock loop (DLL) 122, discussed below. The transmit and receive modules 110 and 120 may be any two modules between which high speed data is to be communicated over data link (channel) 105. For example, the transmit and receive modules 110 and 120 may be plug-in modules or part of plug-in module(s) of a test system assembled in a PXI or PXIe chassis, and the data link 105 between the transmit and receive modules 110 and 120 may be connected via PXI or PXIe backplane through backplane connector, or directly from an external cable.

The communication system 100 has a maximum data latency, which is initially determined as the maximum possible latency through analysis of the potential latency contributors in the communication system 100, including synchronous latencies and analog delays. For example, determining the maximum data latency may include determining the maximum number of synchronous elements in the communication system 100, and identifying minimum and/or maximum delay specifications for the analog delays associated with these synchronous elements, respectively. In the depicted embodiment, all of the elements are synchronous elements in the communication system 100 except for the data link 105, which has a variable latency based on length.

The communication system 100 further includes a synchronization pulse generator 130 configured to generate a common synchronization pulse to enable measurement of actual latency of the communication system 100 across the transmit module 110 and the receive module 120. The synchronization pulse generator 130 may be a simple digital circuit that generates a one clock wide pulse on request, or an external signal generator or arbitrary waveform generator, for example. The synchronization pulse output by the synchronization pulse generator 130 arrives at the transmit module 110 and the receive module 120 simultaneously during a calibration stage (latency measurement mode) of the communication system 100 to initiate the measurement process. Alternatively, the synchronization pulse may arrive at the receive module 120 at a known fixed delay separation from when the synchronization pulse arrives at the transmit module 110, so that a start time of the measurement process may be determined.

The communication system 100 also includes a reference clock generator 140 configured to provide a common clock signal to the transmit module 110 and the receive module 120. In particular, the reference clock generator 140 outputs the common clock signal to a TX clock generator 119 of the transmit module 110, which generates a TX clock signal for the transmit module 110, and to a RX clock generator 129 of the receive module 120, which generates a RX clock signal for the receive module 120. The reference clock generator 140 typically provides a 100 MHz clock frequency, but other frequencies may work as well, provided the TX clock generator 119 and the RX clock generator 129 can divide or multiply the frequencies to the desired clock frequency needed to operate the link at desired data rate. The TX clock generator 119 and the RX clock generator 129 are synchronized, meaning their output clock have exact same frequency but could have a phase difference. In an alternative embodiment, the common clock signal from the reference clock generator 140 is provided directly to the elements of the transmit module 110 and the receive module 120 without going through respective clock generators.

In the depicted embodiment, transmit module 110 includes a pattern generator 111 and (TX) buffer 113. The pattern generator 111 is configured to generate a unique alignment test pattern in response to receiving the synchronization pulse from the synchronization pulse generator 130 during the calibration stage. The pattern generator 111 may be implemented using an arbitrary waveform generator, an arbitrary function generator, an RF signal generator, or a digital circuit inside a field programmable gate array (FPGA) in which the communication system 100 lies, for example. The transmit buffer 113 is configured to buffer the test pattern provided by the pattern generator 111 for transmission in the pseudo synchronous communications link to the receive module 120. Following the calibration stage, the pattern generator 111 is removed from the communication system 100, and the transmit buffer 113 receives data from a data source, such as a device under test (DUT), traversing the pseudo synchronous communications link during a operational stage. Each of the pattern generator 111 and the transmit buffer 113 receives the TX clock signal from the TX clock generator 119 for synchronization.

The transmit module 110 may optionally include (indicated by dashed lines) a serializer 112 between the pattern generator 111 and the transmit buffer 113. The serializer 112 is configured to serialize the test pattern output by the pattern generator 111 during the calibration stage, and to serialize the data received by the transmit module 110 during the operational stage. Serializing the test pattern is needed where overall higher data transfer rate is required but it is not possible to run the pattern generator 111 or the DUT at a high enough clock rate to generate the data at the rate needed to meet the data transfer rate. In this case, the pattern generator 111 or the DUT may generate multiple data bits in parallel on every clock cycle at a slower clock rate, which is an integral factor for the serial rate at the data link 105. These multiple bits generated every clock cycle are then sent one after another (serialized) over the data link 105 at a higher data rate. The serialization process thus translates the data from data objects in complex data structures into a bit stream, for example, to facilitate the transmission of the data over the pseudo synchronous communications link. The serializer 112 receives the TX clock signal for serialization.

The receive module 120 includes a receive (RX) buffer 121, the DLL 122 mentioned above, and FIFO buffer 124. The receive buffer 121 is configured to buffer the test pattern received from the transmit buffer 113, and the DLL 122, mentioned above. The DLL 122 is configured to perform eye tracking on the test pattern output from the receive buffer 121. Performing the eye tracking includes keeping a sample point of the test pattern in a center of a data eye to provide data and clock recovery of the test pattern in response to the clock signal from the RX clock generator 129. The DLL 122 includes a phase detector for detecting deviation of a data sample point from nominal in the data eye, and multiple variable delay elements for repositioning the data sample point to the center of the data eye (nominal sampling point). The DLL 122 receives the RX clock signal from the RX clock generator 129 to perform the eye tracking on the incoming data received via the receive buffer 121 and then recover clock and data from it.

When the transmit module 110 includes the serializer 112, the receive module 120 includes an optional deserializer 123 between the DLL 122 and the FIFO buffer 124. The deserializer 123 is configured to deserialize the test pattern output by the DLL 122. The deserializer 123 also receives the RX clock signal from the DLL 122 to write the data or test pattern into the FIFO buffer 124.

The FIFO buffer 124 is configured to perform phase compensation of the data (or test pattern) output from the DLL 122. The phase compensation corrects for clock phase difference between the clock signal from the TX clock generator 119 and the clock signal from the RX clock generator 129, as is well known in the art, so that data (or test pattern) can be adapted to the clock generated by RX clock generator 129 clock. The FIFO buffer 124 receives the RX clock signal from the DLL 122 to write data into it for phase compensation.

The receive module 120 further includes modules directed to determining actual latency incurred by the communication system 100. In particular, the receive module 120 includes a symbol aligner module 125, a pattern detector module 126 and a latency measurement module 127, each of which receives the RX clock signal from the RX clock generator 129 to operate. In addition, each of the symbol aligner module 125, the pattern detector module 126 and the latency measurement module 127 receives the synchronous pulse from the synchronization pulse generator 130 at the same time the pattern generator 111 receives the synchronous pulse or at a known fixed delay separation from when the pattern generator 111 receives synchronization pulse.

The output of the FIFO buffer 124 is clocked by the RX clock signal and supplied to the symbol aligner module 125, e.g., when the serializer 112 and deserializer 123 are in use. The symbol aligner module 125 is configured to align the data (e.g., test pattern) to the symbol boundary of the RX clock signal, and to output the data in the form of one full symbol every clock cycle of the RX clock signal. To perform test pattern alignment, the pattern generator 111 sends a test pattern on reception of the synchronization pulse during the calibration stage. In the depicted embodiment, the test pattern consists of one predefined symbol, although in other embodiments, it may comprise a predefined sequence of multiple predefined symbols. The pattern generator 111 outputs one symbol of the test pattern every clock cycle on its output (point A). The serializer 112 may serialize the test pattern. This serial data passes through the transmit buffer 113, the data link 105, the receive buffer 121, the DLL 122, the deserializer 123 and the FIFO buffer 124 before it reaches the symbol aligner module 125. The test pattern at the deserializer 123 and the FIFO 124 output could be shifted (not symbol aligned) such that part of the symbol is delivered on one clock cycle and the remaining part is delivered on the next clock cycle. This shift in the data with respect to a clock edge of the RX clock signal may occur because of the latency across the data link 105 and/or the delay introduced in the data by the DLL 122 to sample the data bit at the center of the eye, for example. Both of these delays may not be an integer multiple of the clock cycle period. The symbol aligner module 125 therefore looks for the symbol boundary in the incoming data, shifts the data to align one full symbol per clock cycle, and outputs an aligned symbol on every clock cycle. Symbol aligner module 125 starts looking for symbol alignment in response to the synchronous pulse.

The synchronization pulse from the synchronization pulse generator 130 triggers the pattern generator 111 to send the test pattern at first latency point A. This test pattern passes through the serializer 112, the transmit buffer 113, the data link 105, the receive buffer 121, the DLL 122, the deserializer 123, the FIFO buffer 124, and the symbol aligner module 125 and reaches the pattern detector module 126. The pattern detector module 126 is configured to detect the test pattern in the symbol aligned data after receiving the synchronous pulse from the synchronization pulse generator 130. That is, when the pattern detector module 126 receives the synchronous pulse, it begins looking for the test pattern in the aligned data. The pattern detector module 126 outputs a stop signal as soon as it detects the test pattern.

The latency measurement module 127 is configured to count clock cycles between when it first receives the synchronous pulse from the synchronization pulse generator 130 and when it subsequently receives the stop signal from the pattern detector module 126 to provide a latency count. That is, the latency measurement module 127 begins counting the clock cycles of the RX clock signal received from the RX clock generator 129 in response to receiving the synchronous pulse received from synchronization pulse generator 130. The latency measurement module 127 stops counting the clock cycles in response to receiving the stop signal output from the pattern detector module 126. The total number of counted clock cycles during this period determines the latency count. For example, when the test pattern is N symbols in length, then (N−1) needs to be subtracted from the counted clock cycles to get the final latency count value in number of clock cycles. This latency count indicates the actual data path latency occurring between the first latency point A at the output of the pattern generator 111 in the transmit module 110 and second latency point B at the output of the pattern detector module 126 in the receive module 120.

The receive module 120 also includes a latency compensation module 128, which receives the latency count from the latency measurement module 127. During a calibration stage, the pattern detector module 126 is configured to determine a latency difference between the actual data path latency (indicated by the latency count) and the previously determined maximum data latency of the system. During the operational stage, the latency compensation module 128 is configured to add the latency difference to a data signal, transmitted from the transmit module 110 to the receive module 120 in the pseudo synchronous communications link after the calibration, to compensate for the latency difference. Accordingly, a total latency of the communication system 100, between the first latency point A and third latency point C at the output of the latency compensation module 128, with regard to the data signal will be equal to the maximum data latency. Stated differently, the latency between the first latency point A and the third latency point C is fixed to always be equal to the maximum data latency that could occur for the communication system 100. This maximum latency of the communication system 100 may be used as its characteristics or a parameter where the data at the output (third latency point C) may be assumed to be available in a fixed number of clock cycles after the data is presented at the input (first latency point A).

In the above description, the clock cycles of the clock on which elements of the transmit module 110 are operating are from the TX clock generator 119 and the clock cycles of the clock on which elements of the receive module 120 are operating are from the RX clock generator 129. However, it is understood that these clock cycles may come directly from reference clock generator 140 for both the transmit module 110 and the receive module 120 without departing from the scope of the present teachings. Reference to clock cycles corresponding to the common clock signal refer to both configurations.

The symbol aligner module 125, the pattern detector module 126, the latency measurement module 127, and the latency compensation module 128 may be implemented by one or more processing units provided the latency through them is fixed. The one or more processing units may include one or more processors, microprocessors or microcontrollers, a state machine, a programmable logic device, FPGAs, application specific integrated circuits (ASICs), or combinations thereof, using any combination of hardware, software, firmware, hard-wired logic circuits, or combinations thereof. As such, the term processing unit encompasses electronic component(s) able to execute a program or machine executable instructions, may be interpreted to include more than one processor or processing core, as in a multi-core processor and/or parallel processors, for example.

The one or more processing units may communicate with memory for storing instructions used to implement some or all aspects of methods and processes described herein. The memory may be implemented by any number, type and combination of random access memory (RAM) and read-only memory (ROM), for example, and may store various types of information, such as software algorithms and computer programs, all of which are executable by the one or more processing units. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of computer readable storage medium known in the art.

Figure 2:
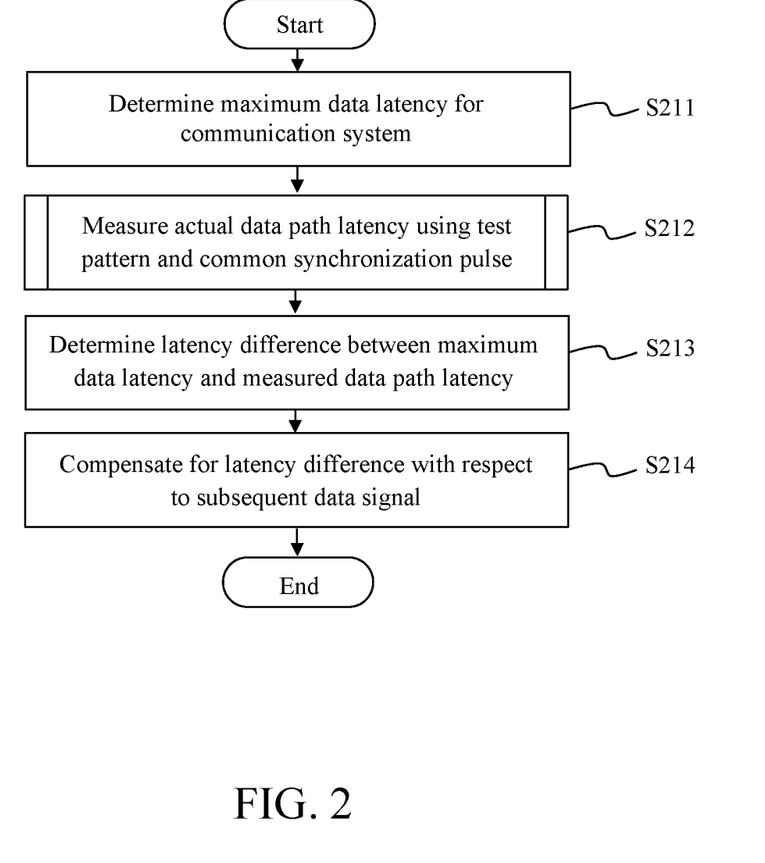
FIG. 2 is a flow diagram of a method of compensating for latency in a communication system, according to a representative embodiment.

FIG. 2 is a flow diagram of a method of compensating for latency in a communication system, according to a representative embodiment. The communication system includes a transmit module and a receive module in a pseudo synchronous communications link, as discussed above with reference to FIG. 1.

Referring to FIG. 2, a maximum data latency for the communication system is determined, based on synchronous latencies and analog delays of the synchronous elements in the communication system, in block S211. That is, determining the maximum data latency may include determining a maximum number of synchronous elements in the communication system, and identifying minimum and/or maximum delay specifications for the analog delays associated with the synchronous elements, respectively. The synchronous latencies may include pipelines and maximum FIFO latency, and the analog delays may include media propagation delays, IO buffer delays and clock distribution delays, for example. The synchronous latencies and analog delays may be determined based on technical specifications for the synchronous elements. They may be determined manually, or automatically using an algorithm populated with the various technical specification from a predetermined database, as would be apparent to one skilled in the art. To compute or measure maximum data latency, various variable latency components need to be assumed or setup at their maximum possible latency. These variable latency components are the data link 105, the DLL 122 and the FIFO buffer 124.

In a process indicated by block S212, an actual data path latency is measured by determining a delay in receiving at the receive module a test pattern transmitted from the transmit module using a common synchronization pulse provided to the transmit module and the receive module during a calibration stage of the communication system. The common synchronization pulse is provided simultaneously to the transmit and receive modules, or is provided with a known fixed latency separation such that the receive module is able to determine the time at which the common synchronization pulse is provided to the transmit module.

Figure 3:
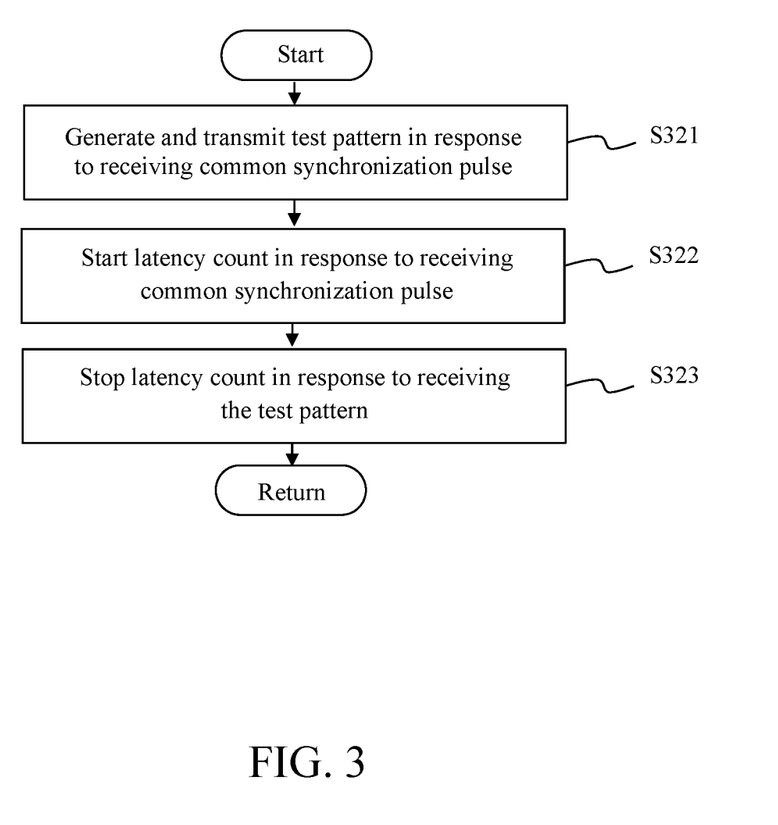
FIG. 3 is a flow diagram of a process of measuring the actual data path latency in the method of compensating for latency in a communication system, according to a representative embodiment.

FIG. 3 is a flow diagram of the process of measuring the actual data path latency in block S212, according to a representative embodiment. Referring to FIG. 3, the test pattern is generated by the transmit module and transmitted to the receive module in block S321 in response to the transmit module receiving the common synchronization pulse. The test pattern is generated by a pattern generator in the transmit module, discussed above, and may be any unique alignment pattern identifiable by the receive module. In block S322, a latency count is started at the receive module in response to the receive module receiving the common synchronization pulse. In particular, the latency count may be started by a latency measurement module, discussed above, when the latency measurement module receives the common synchronization pulse. The latency count includes counting clock cycles of a common clock signal received by both the transmit and receive modules from a reference clock. In block S323, the latency count at the receive module ends in response to the pattern detector module at the receiver receiving the test pattern. In particular, the latency count may be stopped by the latency measurement module when the latency measurement module receives an indication that the test pattern has been received at pattern detector module, discussed above. The latency count indicates the number of clock cycles that occur between the time the pattern generator outputs the test pattern and the time the pattern detector module receives the test pattern. The latency count therefore provides the actual data path latency, which occurs between first latency point A and the second latency point B shown in FIG. 1.

In block S213, a latency difference is determined between the determined maximum data latency and the measured data path latency based on the latency count. The latency difference may be determined by simply subtracting the measured data path latency from the determined maximum data latency. The latency difference is stored in memory, such as a buffer or a register, for example.

In block S214, the latency difference is compensated for with respect to a subsequent data signal transmitted from the transmit module to the receive module in the pseudo synchronous communications link during an operational stage of the communication system. Compensating for the latency difference may include adding the latency difference to the subsequent data signal, for example. By compensating for the latency difference, a total latency of the communication system with regard to the subsequent data signal is equal to the maximum possible data latency for the communication system, as determined in block S211. Accordingly, the total latency will consistently conform to the maximum data latency regardless of the data path latency experienced by the data signal.

In an embodiment, the above method further includes serializing the test pattern at the transmit module prior to transmitting the test pattern to the receive module at block S211. In this case, the DLL is performed on the test pattern at the receive module, and the test pattern is subsequently deserialized and aligned to a symbol boundary (one full symbol per clock cycle) corresponding to a clock cycle by a symbol aligner module, discussed above, prior to being detected by the pattern detector module in block S212.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for performing eye tracking on signals, wherein the system has a maximum data latency, the system comprising:
   a transmit module configured to transmit signals in a pseudo synchronous communications link;
   a receive module configured to receive the signals from the transmit module in the pseudo synchronous communications link, and to provide the eye tracking;
   a synchronization pulse generator configured to generate a common synchronization pulse that arrives at the transmit module and the receive module simultaneously or with a known fixed delay separation during calibration of the system; and
   a reference clock generator configured to provide a common clock signal to the transmit module and the receive module,
   wherein the transmit module comprises:
      a pattern generator configured to output a unique alignment test pattern upon reception of the synchronization pulse during the calibration; and
   wherein the receive module comprises:
      a delay locked loop (DLL) configured to perform eye tracking on the test pattern, keeping a sample point of the test pattern in a center of a data eye to provide data and clock recovery of the test pattern in response to the common clock signal;
      a symbol aligner module configured to align the test pattern from the DLL to a symbol boundary corresponding to the common clock signal, to provide one full symbol per clock cycle, in response to the synchronization pulse received from the synchronization pulse generator to provide aligned data;
      a pattern detector module configured to detect the test pattern in the aligned data, and to output a stop signal in response to the detected test pattern and the synchronization pulse received from the synchronization pulse generator;
      a latency measurement module configured to begin a latency measurement in response to the synchronization pulse received from synchronization pulse generator, and to stop the latency measurement in response to the stop signal output from the pattern detector; and
      a latency compensation module configured to determine a latency difference between the latency measurement provided by the latency measurement module during the calibration and the maximum data latency of the system, and to add the latency difference to a subsequent data signal, transmitted from the transmit module to the receive module in the pseudo synchronous communications link after the calibration, to compensate for the latency difference, such that a total latency of the system with regard to the subsequent data signal is equal to the maximum data latency for the system.

2. The system of claim 1, wherein the latency measurement module begins the latency measurement by counting clock cycles corresponding to the common clock signal received from the reference clock generator in response to the synchronization pulse received from synchronization pulse generator, and to stop the latency measurement by stopping the counting of the clock cycles in response to the stop signal output from the pattern detector module to provide a latency count, wherein the latency count indicates a number of clock cycles of latency from an output of the pattern generator in the transmit module to an output of the pattern detector in the receive module.

3. The system of claim 1, wherein the transmit module further comprises a transmit buffer configured to buffer the test pattern for transmission to the receive module; and
   wherein the receive module further comprises a receive buffer configured to buffer the test pattern received from the transmit buffer during the calibration.

4. The system of claim 3, the receive module further comprises a first-in first-out (FIFO) buffer configured to perform phase compensation of the test pattern output from the DLL.

5. The system of claim 1, wherein the transmit module further comprises a serializer configured to serialize the test pattern output by the pattern generator, and
   wherein the receive module further comprises a deserializer configured to deserialize the test pattern output by the DLL.

6. The system of claim 1, wherein the DLL comprises a phase detector for detecting deviation of a data sample point from nominal in the data eye, and a plurality of variable delay elements configured to reposition the data sample point to the center of the data eye.

7. The system of claim 1, wherein the transmit module further comprises a transmit clock generator configured to output a transmit clock signal to the pattern generator in response to the common clock signal from the reference clock generator,
   wherein the receive module further comprises a receive clock generator configured to output a receive clock signal to the DLL, the symbol aligner module, the pattern detector module, the latency measurement module, and the latency compensation module in response to the common clock signal from the reference clock generator, and
   wherein the clock cycle corresponding to the common clock signal comprises a clock cycle of the receive clock signal.

8. A method of compensating for latency in a system comprising a transmit module and a receive module in a pseudo synchronous communications link, the receive module implementing a delay locked loop (DLL) for signals received from the transmit module, the method comprising:
   determining a maximum data latency for the system based on synchronous latencies and analog delays; and
   measuring an actual data path latency by determining a delay in receiving at the receive module a test pattern transmitted from the transmit module using a common synchronization pulse provided to the transmit module and the receive module simultaneously or with a known fixed latency separation during calibration of the system, wherein measuring the actual data path latency comprises:
   transmitting the test pattern from the transmit module to the receive module in response to receiving the common synchronization pulse at the transmit module;
   starting a latency count at the receive module in response to receiving the common synchronization pulse at the receive module;
   ending the latency count at the receive module in response to receiving the test pattern at the receive module, the latency count indicating the actual data path latency;
   determining a latency difference between the determined maximum data latency and the measured data path latency based on the latency count; and compensating for the latency difference for a subsequent data signal transmitted from the transmit module to the receive module in the pseudo synchronous communications link, such that a total latency of the system with regard to the subsequent data signal is equal to the maximum data latency for the system.

9. The method of claim 8, wherein the synchronous latencies include pipelines and maximum first-in first-out (FIFO) latency, and wherein the analog delays include media propagation delays, IO buffer delays and clock distribution delays.

10. The method of claim 9, wherein determining the maximum data latency for the system comprises determining a maximum number of synchronous elements in the system, and identifying minimum/maximum delay specifications for the analog delays associated with the synchronous elements, respectively.

11. The method of claim 8, wherein starting the latency count comprises beginning to count clock cycles corresponding to a common clock signal received by the transmit module and the receive module in response to receiving the common synchronization pulse, and
wherein ending the latency count comprises stopping counting the clock cycles of the common clock signal in response to receiving the test pattern.

12. The method of claim 8, further comprising:
serializing the test pattern at the transmit module prior to transmitting the test pattern;
performing the DLL on the test pattern at the receive module;
deserializing the test pattern at the receive module following the DLL; and
aligning the test pattern in the deserialized test pattern to a clock cycle corresponding to a common clock signal at the receive module prior to measuring the actual path latency.

13. The method of claim 8, wherein compensating for the latency difference comprises adding the latency difference to the subsequent data signal.

14. A system for performing eye tracking on signals in a pseudo synchronous communications link, wherein the system has a maximum data latency, the system comprising:
a pattern generator configured to output a unique alignment test pattern upon reception of a synchronization pulse during calibration of the system;
a serializer configured to serialize the test pattern output by the pattern generator;
a synchronization pulse generator configured to generate the synchronization pulse during the calibration;
a reference clock generator configured to provide a common clock signal;
a delay locked loop (DLL) configured to perform eye tracking on the test pattern;
a deserializer configured to deserialize the test pattern output by the DLL;
a symbol aligner module configured to align the test pattern from the DLL to a symbol boundary corresponding to the common clock signal for one full symbol per clock cycle to provide aligned data;
a pattern detector module configured to detect the test pattern in the aligned data, and to output a stop signal in response to the detected test pattern and the synchronous pulse received from the synchronization pulse generator;

a latency measurement module configured to begin a latency measurement in response to the synchronous pulse received from synchronization pulse generator, and to stop the latency measurement in response to the stop signal output from the pattern detector; and
a latency compensation module configured to determine a latency difference between the latency measurement provided by the latency measurement module during the calibration and the maximum data latency of the system, and to compensate for the latency difference to a subsequent data signal communicated through the pseudo synchronous communications link after the calibration, such that a total latency of the system with regard to the subsequent data signal is equal to the maximum data latency for the system,
wherein the synchronization pulse arrives at the pattern generator, the symbol aligner, the pattern detector module, and the latency measurement module simultaneously or with a known fixed delay separation.

15. The system of claim 14, wherein the latency measurement module begins the latency measurement by counting clock cycles in response to receiving the synchronous pulse, and to stop the latency measurement by stopping the counting of the clock cycles in response to the stop signal output from the pattern detector module to provide a latency count, wherein the latency count indicates a number of clock cycles of latency from an output of the pattern generator to an output of the pattern detector.

16. The system of claim 14, further comprising:
a transmit buffer configured to buffer the test pattern for transmission over a data link; and
a receive buffer configured to buffer the test pattern received from the transmit buffer over the data link.

17. The system of claim 16, further comprising:
a first-in first-out (FIFO) buffer configured to perform phase compensation of the test pattern output from the DLL.

18. The system of claim 14, wherein the DLL comprises a phase detector for detecting deviation of a data sample point from nominal in a data eye, and a plurality of variable delay elements configured to reposition the data sample point to a center of the data eye, which is a nominal sampling point.

19. The system of claim 14, further comprising:
a transmit clock generator configured to output a transmit clock signal to the pattern generator in response to the common clock signal from the reference clock generator; and
a receive clock generator configured to output a receive clock signal to the DLL, the symbol aligner module, the pattern detector module, the latency measurement module, and the latency compensation module in response to the common clock signal from the reference clock generator,
wherein the clock cycle corresponding to the common clock signal comprises a clock cycle of the receive clock signal.

20. The system of claim 14, wherein the latency compensation module compensates for the latency difference by adding the latency different to the subsequent data signal.

* * * * *